US011143023B2

(12) United States Patent
Ma et al.

(10) Patent No.: US 11,143,023 B2
(45) Date of Patent: Oct. 12, 2021

(54) COMPONENT SIGNAL DECOUPLING FOR MULTISUB RESISTIVITY TOOL WITH SPACED ANTENNAS (71) Applicant: Halliburton Energy Services, Inc., Houston, TX (US)

(72) Inventors: Jin Ma, Singapore (SG); Hsu-Hsiang Wu, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 451 days.

(21) Appl. No.: 16/095,918

(22) PCT Filed: Dec. 12, 2017

(86) PCT No.: PCT/US2017/065846
§ 371 (c)(1),
(2) Date: Oct. 23, 2018

(87) PCT Pub. No.: WO2019/117873
PCT Pub. Date: Jun. 20, 2019

(65) Prior Publication Data
US 2020/0378247 A1   Dec. 3, 2020

(51) Int. Cl.
*E21B 49/00* (2006.01)
*E21B 47/13* (2012.01)
*E21B 7/04* (2006.01)

(52) U.S. Cl.
CPC ............... *E21B 49/00* (2013.01); *E21B 7/04* (2013.01); *E21B 47/13* (2020.05)

(58) Field of Classification Search
CPC ............ E21B 49/00; E21B 47/13; E21B 7/04; G01V 3/28
See application file for complete search history.

(56) References Cited

U.S. PATENT DOCUMENTS 6,181,138 B1    1/2001  Hagiwara et al.
7,898,259 B2    3/2011  Hall et al.
(Continued)

FOREIGN PATENT DOCUMENTS

| WO | 20150053840 | 5/2010 |
| WO | 2010129297  | 11/2010 |
| WO | 2018067112  | 4/2018 |
| WO | 2018222208  | 12/2018 |

OTHER PUBLICATIONS

Pitcher et al., Interpreting Azimuthal Propagation Resistivity: A Paradigm Shift, May 23-26, 2011, SPE EUROPE/EAGE Annual Conference and Exhibition, Vienna, Austria, 16 pp. (Year: 2011).*
(Continued)

*Primary Examiner* — Toan M Le
(74) *Attorney, Agent, or Firm* — Benjamin Ford; C. Tumey Law Group PLLC (57) ABSTRACT

Methods and systems for decoupling a component signal. A method may include disposing a logging tool in a wellbore, capturing a signal response with the logging tool from a formation, wherein the logging tool includes a first receiver, a second receiver, and a third receiver, averaging the first receiver and the third receiver to generate a first pseudo antenna, generating a second pseudo antenna which includes an azimuth offset, employing an attenuation factor and expansion factor to generate a pseudo collocated antenna. Furthermore combining responses from a transmitter, the first pseudo antenna, the second pseudo antenna, and the pseudo collocated antenna to decouple a component, which may determine the boundaries of a formation from the component. A well measurement system for decoupling a component may include a logging tool, conveyance, and information handling system. The logging tool may include a first downhole tool, a receiver, and a transmitter.

20 Claims, 11 Drawing Sheets (56) References Cited

U.S. PATENT DOCUMENTS

| | | |
|---|---|---|
| 8,954,280 B2 | 2/2015 | Li et al. |
| 9,678,237 B2 | 6/2017 | Wu et al. |
| 9,753,175 B2 | 9/2017 | Li et al. |
| 2007/0294035 A1 | 12/2007 | Rabinovich et al. |
| 2012/0286790 A1 | 11/2012 | Yang et al. |
| 2015/0240629 A1 | 8/2015 | Wu et al. |
| 2015/0285061 A1 | 10/2015 | Wu et al. |
| 2016/0002977 A1 | 1/2016 | Wu et al. |
| 2016/0116624 A1 | 8/2016 | Dzevat |
| 2016/0245952 A1 | 8/2016 | Dupuis et al. |
| 2016/0252643 A1 | 9/2016 | Sun et al. |
| 2018/0239048 A1 | 5/2018 | Wu et al. |

OTHER PUBLICATIONS

One_Petro_Search_Results, Mar. 2, 2021, 14 pp. (Year: 2021).*
"Deep directional electromagnetic measurements for optional well placement" Omeragic, D, et al. 2005.
"New Directional Electromagnetic Tool for Proactive Geosteering and Accurate Formation Evaluation While Drilling" Li, Q. et al. 2005.
"Evaluation of Resistivity Anisotropy and Formation Dip from Directional Electromagnetic Tools While Drilling" Sun, K. et al. 2010.
ISRWO International Search Report and Written Opinion for PCT/US2017/065846 dated Sep. 12, 2018.

\* cited by examiner

COMPONENT SIGNAL DECOUPLING FOR MULTISUB RESISTIVITY TOOL WITH SPACED ANTENNAS

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. As wellbores get deeper, logging tools may become longer and more sophisticated. Measurements by antennas on the logging tool may provide information that may allow an operator to determine wellbore and/or formation properties. However, a logging tool may stretch over a large area and further include large spacing and increased mechanical variance between antennas, wherein the antennas may include transmitters and receivers. This may greatly complicate the relation between raw responses and formation properties, and lead to inaccurate interpretation from recordings, which may skew results of wellbore and formation properties. A method of decoupling component signals from raw responses recorded by the antenna may produce more accurate readings.

BRIEF DESCRIPTION OF THE DRAWINGS

These drawings illustrate certain aspects of some examples of the present disclosure, and should not be used to limit or define the disclosure.

DETAILED DESCRIPTION

The present disclosure relates generally to a method for decoupling component signals from a logging tool. More particularly, measurements by antennas disposed across a logging tool. Decoupling component signals of a logging tool may help in determining the properties of a wellbore and/or formation accurately and efficiently. A logging tool may include any number of downhole sub-assemblies, which may include antennas, which may include a transmitter and/or receiver.

Figure 1:
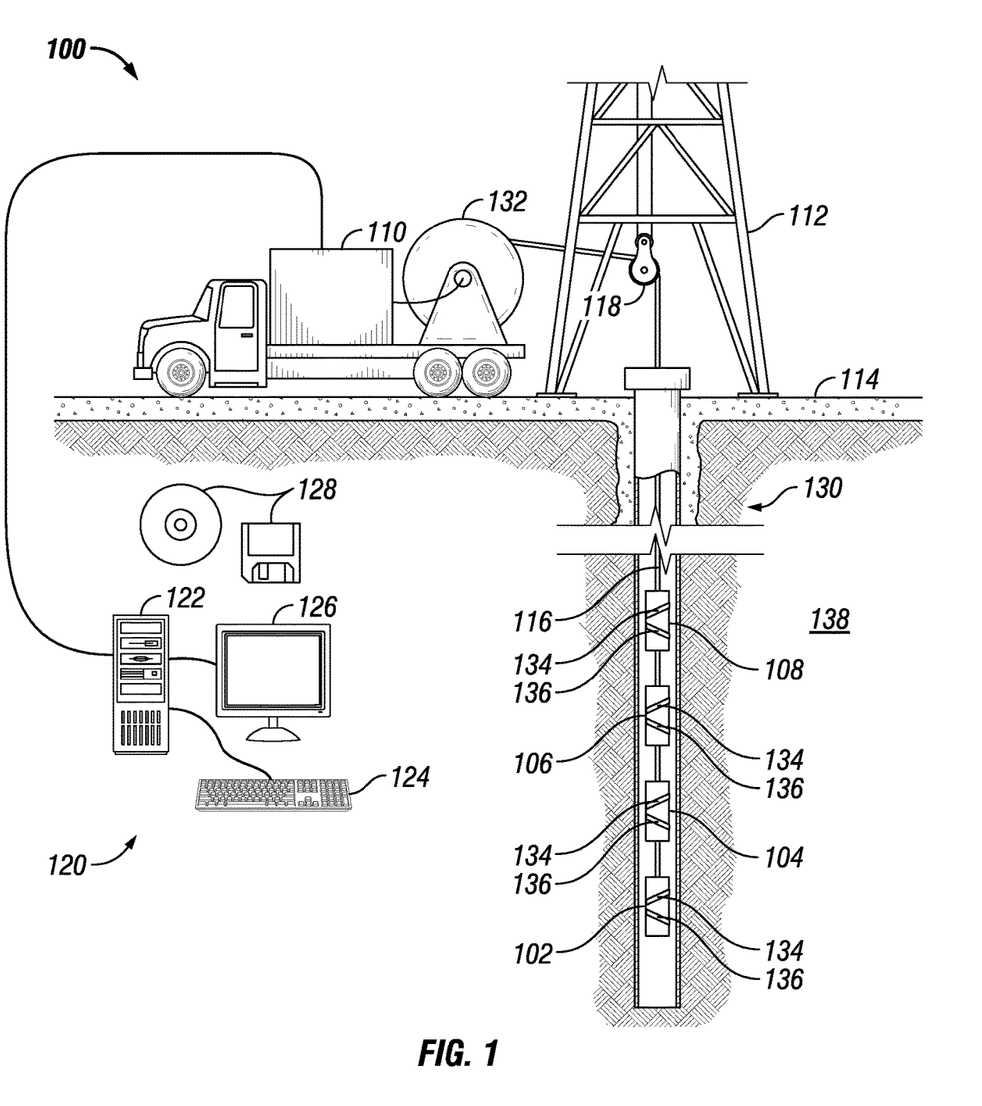
FIG. 1 illustrate an example of a well measurement system.

FIG. 1 illustrates a cross-sectional view of a well measurement system 100. As illustrated, well measurement system 100 may include a first downhole tool 102, a second downhole tool 104, a third downhole tool 106, and/or a fourth downhole tool 108. It should be noted that well measurement system 100 may include first downhole tool 102. In additional examples, there may be a plurality of downhole tools, such as first downhole 102. As illustrated, first downhole tool 102, second downhole tool 104, third downhole tool 106, and/or fourth downhole tool 108 may attach to a vehicle 110. In examples, it should be noted that first downhole tool 102, second downhole tool 104, third downhole tool 106, and/or fourth downhole tool 108 may not be attached to a vehicle 110. First downhole tool 102, second downhole tool 104, third downhole tool 106, and/or fourth downhole tool 108 may be supported by rig 112 at surface 114. First downhole tool 102, second downhole tool 104, third downhole tool 106, and/or fourth downhole tool 108 may be tethered to vehicle 110 through conveyance 116. Conveyance 116 may be disposed around one or more sheave wheels 118 to vehicle 110. Conveyance 116 may include any suitable means for providing mechanical conveyance for first downhole tool 102, second downhole tool 104, third downhole tool 106, and/or fourth downhole tool 108, including, but not limited to, wireline, slickline, coiled tubing, pipe, drill pipe, downhole tractor, or the like. In some embodiments, conveyance 116 may provide mechanical suspension, as well as electrical connectivity, for first downhole tool 102, second downhole tool 104, third downhole tool 106, and/or fourth downhole tool 108. Conveyance 116 may include, in some instances, a plurality of electrical conductors extending from vehicle 110. Conveyance 116 may include an inner core of several electrical conductors covered by an insulating wrap. An inner and outer steel minor sheath may be wrapped in a helix in opposite directions around the conductors. The electrical conductors may be used for communicating power and telemetry between vehicle 110 and first downhole tool 102, second downhole tool 104, third downhole tool 106, and/or fourth downhole tool 108. Information from first downhole tool 102, second downhole tool 104, third downhole tool 106, and/or fourth downhole tool 108 may be gathered and/or processed by information handling system 120. For example, signals recorded by first downhole tool 102, second downhole tool 104, third downhole tool 106, and/or fourth downhole tool 108 may be stored on memory and then processed by first downhole tool 102, second downhole tool 104, third downhole tool 106, and/or fourth downhole tool 108. The processing may be performed real-time during data acquisition or after recovery of first downhole tool 102, second downhole tool 104, third downhole tool 106, and/or fourth downhole tool 108. Processing may alternatively occur downhole or may occur both downhole and at surface. In some embodiments, signals recorded by first downhole tool 102, second downhole tool 104, third downhole tool 106, and/or fourth downhole tool 108 may be conducted to information handling system 120 by way of conveyance 116. Information handling system 120 may process the signals, and the information contained therein may be displayed for an operator to observe and stored for future processing and reference. Information handling system 120 may also contain an apparatus for supplying control signals and power to first downhole tool 102, second downhole tool 104, third downhole tool 106, and/or fourth downhole tool 108.

Systems and methods of the present disclosure may be implemented, at least in part, with information handling system 120. Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a video display 126. Information handling system 120 may also include one or more buses operable to transmit communications between the various hardware components.

Alternatively, systems and methods of the present disclosure may be implemented, at least in part, with non-transitory computer-readable media 128. Non-transitory computer-readable media 128 may include any instrumentality or aggregation of instrumentalities that may retain data and/or instructions for a period of time. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 112 includes a load cell (not shown) which may determine the amount of pull on conveyance 116 at the surface of wellbore 130. Information handling system 120 may include a safety valve which controls the hydraulic pressure that drives drum 132 on vehicle 110 which may reels up and/or release conveyance 116 which may move first downhole tool 102, second downhole tool 104, third downhole tool 106, and/or fourth downhole tool 108 up and/or down wellbore 130. The safety valve may be adjusted to a pressure such that drum 132 may only impart a small amount of tension to conveyance 116 over and above the tension necessary to retrieve conveyance 116 and/or first downhole tool 102, second downhole tool 104, third downhole tool 106, and/or fourth downhole tool 108 from wellbore 130. The safety valve is typically set a few hundred pounds above the amount of desired safe pull on conveyance 116 such that once that limit is exceeded; further pull on conveyance 116 may be prevented.

In examples, first downhole tool 102, second downhole tool 104, third downhole tool 106, and/or fourth downhole tool 108 may include a transmitter 134 and/or a receiver 136. It should be noted that transmitter 134, receiver 136, a plurality of transmitters, a plurality of receivers, a plurality of antennas, and/or any combination thereof may be referred to as an antenna and/or a collocated antenna. In examples, first downhole tool 102, second downhole tool 104, third downhole tool 106, and/or fourth downhole tool 108 may operate with additional equipment (not illustrated) on surface 114 and/or disposed in a separate well measurement system (not illustrated) to record measurements and/or values from formation 138. During operations, transmitter 134 may broadcast a signal from first downhole tool 102, second downhole tool 104, third downhole tool 106, and/or fourth downhole tool 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by formation 138. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130, fluids, and/or formation 138.

Figure 2:
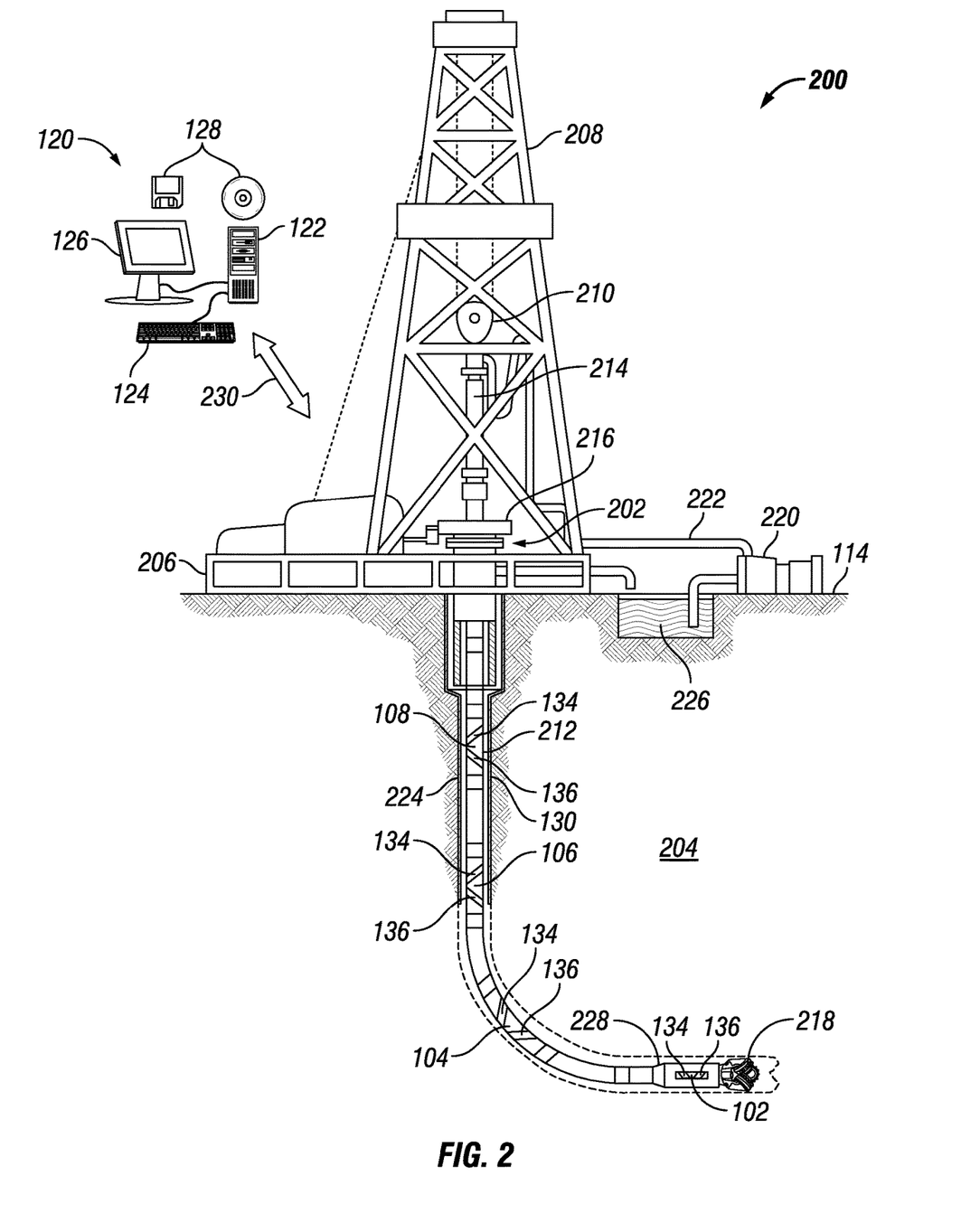
FIG. 2 illustrates another example of a well measurement system.

FIG. 2 illustrates an example in which first downhole tool 102, second downhole tool 104, third downhole tool 106, and/or fourth downhole tool 108 (e.g., Referring to FIG. 1) may be disposed in a drilling system 200. As illustrated, wellbore 130 may extend from a wellhead 202 into a subterranean formation 204 from surface 114 (e.g., Referring to FIG. 1). Generally, wellbore 130 may include horizontal, vertical, slanted, curved, and other types of wellbore geometries and orientations. Wellbore 130 may be cased or uncased. In examples, wellbore 130 may include a metallic material. By way of example, the metallic member may be a casing, liner, tubing, or other elongated steel tubular disposed in wellbore 130.

As illustrated, wellbore 130 may extend through subterranean formation 204. As illustrated in FIG. 2, wellbore 130 may extending generally vertically into the subterranean formation 204, however wellbore 130 may extend at an angle through subterranean formation 204, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 114. Without limitation, drill bit 218 may include, roller cone bits, PDC bits, natural diamond bits, any hole openers, reamers, coring bits, and the like. As drill bit 218 rotates, it may create and extend wellbore 130 that penetrates various subterranean formations 204. A pump 220 may circulate drilling fluid through a feed pipe 222 to kelly 214, downhole through interior of drill string 212, through orifices in drill bit 218, back to surface 114 via annulus 224 surrounding drill string 212, and into a retention pit 226.

With continued reference to FIG. 2, drill string 212 may begin at wellhead 202 and may traverse wellbore 130. Drill bit 218 may be attached to a distal end of drill string 212 and may be driven, for example, either by a downhole motor and/or via rotation of drill string 212 from surface 114 (e.g., Referring to FIG. 1). Drill bit 218 may be a part of bottom hole assembly 228 at distal end of drill string 212. Bottom hole assembly 228 may further include first downhole tool 102 (e.g., Referring to FIG. 1). First downhole tool 102 may be disposed on the outside and/or within bottom hole assembly 228. It should be noted that second downhole tool 104, third downhole tool 106, and/or fourth downhole tool 108 may be disposed on drill string 212. Second downhole tool 104, third downhole tool 106, and/or fourth downhole tool 108 may be disposed on the outside and/or within drill string 212. First downhole tool 102, second downhole tool 104, third downhole tool 106, and/or fourth downhole tool 108 may include a transmitter 134 and/or a receiver 136 (e.g., Referring to FIG. 1). It should be noted that first downhole tool 102, second downhole tool 104, third downhole tool 106, and/or fourth downhole tool 108 may include a plurality of transmitters 134 and/or receivers 136. Transmitters 134 and/or receivers 136 may operate and/or function as described above. As will be appreciated by those of ordinary skill in the art, first downhole tool 102, second downhole tool 104, third downhole tool 106, and/or fourth downhole tool 108 may be a measurement-while drilling (MWD) or logging-while-drilling (LWD) system.

Without limitation, first downhole tool 102, second downhole tool 104, third downhole tool 106, and/or fourth downhole tool 108, transmitters 134, and/or receiver 136 may be connected to and/or controlled by information handling system 120 (e.g., Referring to FIG. 1), which may be disposed on surface 114. Without limitation, information handling system 120 may be disposed down hole in first downhole tool 102, second downhole tool 104, third downhole tool 106, and/or fourth downhole tool 108. Processing of information recorded may occur down hole and/or on surface 114. Processing occurring downhole may be transmitted to surface 114 to be recorded, observed, and/or further analyzed. Additionally, information recorded on information handling system 120 that may be disposed down hole may be stored until first downhole tool 102, second downhole tool 104, third downhole tool 106, and/or fourth downhole tool 108 may be brought to surface 114. In examples, information handling system 120 may communicate with first downhole tool 102, second downhole tool 104, third downhole tool 106, and/or fourth downhole tool 108 through a communication line (not illustrated) disposed in (or on) drill string 212. In examples, wireless communication may be used to transmit information back and forth between information handling system 120 and first downhole tool 102, second downhole tool 104, third downhole tool 106, and/or fourth downhole tool 108. Information handling system 120 may transmit information to first downhole tool 102, second downhole tool 104, third downhole tool 106, and/or fourth downhole tool 108 and may receive as well as process information recorded by first downhole tool 102, second downhole tool 104, third downhole tool 106, and/or fourth downhole tool 108. In examples, a downhole information handling system (not illustrated) may include, without limitation, a microprocessor or other suitable circuitry, for estimating, receiving and processing signals from first downhole tool 102, second downhole tool 104, third downhole tool 106, and/or fourth downhole tool 108. Downhole information handling system (not illustrated) may further include additional components, such as memory, input/output devices, interfaces, and the like. In examples, while not illustrated, first downhole tool 102, second downhole tool 104, third downhole tool 106, and/or fourth downhole tool 108 may include one or more additional components, such as analog-to-digital converter, filter and amplifier, among others, that may be used to process the measurements of first downhole tool 102, second downhole tool 104, third downhole tool 106, and/or fourth downhole tool 108 before they may be transmitted to surface 114. Alternatively, raw measurements from first downhole tool 102, second downhole tool 104, third downhole tool 106, and/or fourth downhole tool 108 may be transmitted to surface 114.

Any suitable technique may be used for transmitting signals from first downhole tool 102, second downhole tool 104, third downhole tool 106, and/or fourth downhole tool 108 to surface 114, including, but not limited to, wired pipe telemetry, mud-pulse telemetry, acoustic telemetry, and electromagnetic telemetry. While not illustrated, first downhole tool 102, second downhole tool 104, third downhole tool 106, and/or fourth downhole tool 108 may include a telemetry subassembly that may transmit telemetry data to surface 114. Without limitation, an electromagnetic source in the telemetry subassembly may be operable to generate pressure pulses in the drilling fluid that propagate along the fluid stream to surface 114. At surface 114, pressure transducers (not shown) may convert the pressure signal into electrical signals for a digitizer (not illustrated). The digitizer may supply a digital form of the telemetry signals to information handling system 120 via a communication link 230, which may be a wired or wireless link. The telemetry data may be analyzed and processed by information handling system 120.

As illustrated, communication link 230 (which may be wired or wireless, for example) may be provided that may transmit data from first downhole tool 102, second downhole tool 104, third downhole tool 106, and/or fourth downhole tool 108 to an information handling system 120 at surface 114. Information handling system 120 may include a central processing unit 122 (e.g., Referring to FIG. 1), a video display 126 (e.g., Referring to FIG. 1), an input device 124 (e.g., keyboard, mouse, etc.) (e.g., Referring to FIG. 1), and/or non-transitory computer-readable media 128 (e.g., optical disks, magnetic disks) (e.g., Referring to FIG. 1) that may store code representative of the methods described herein. In addition to, or in place of processing at surface 114, processing may occur downhole.

First downhole tool 102, second downhole tool 104, third downhole tool 106, and/or fourth downhole tool 108 may include a transmitter 134 and/or a receiver 136. In examples, first downhole tool 102, second downhole tool 104, third downhole tool 106, and/or fourth downhole tool 108 may operate with additional equipment (not illustrated) on surface 114 and/or disposed in a separate well measurement system (not illustrated) to record measurements and/or values from subterranean formation 204. During operations, transmitter 134 may broadcast a signal from first downhole tool 102, second downhole tool 104, third downhole tool 106, and/or fourth downhole tool 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by subterranean formation 204. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130 (e.g., Referring to FIG. 1), fluids, and/or subterranean formation 204.

Figure 3:
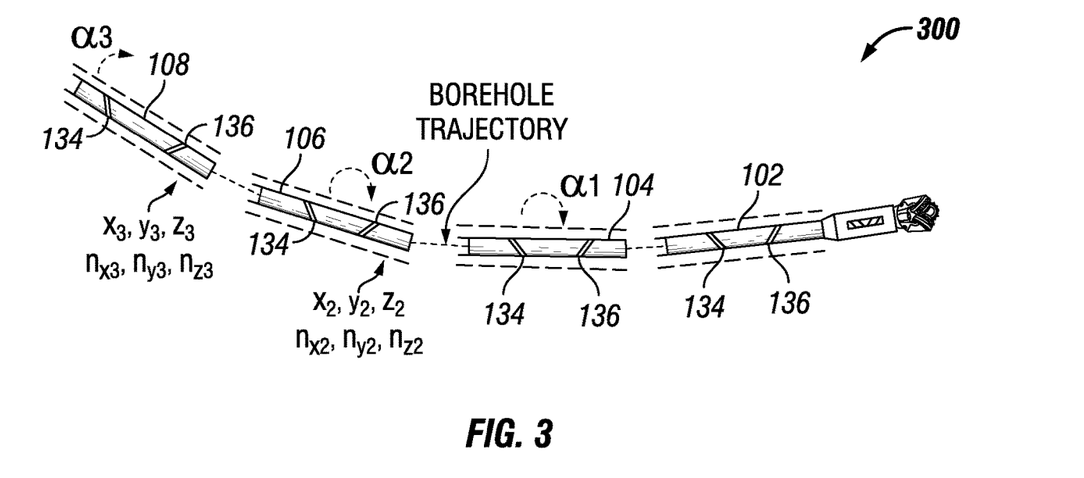
FIG. 3 illustrates an example of a logging tool.

As illustrated in FIG. 3, a logging tool 300 may include first downhole tool 102, second downhole tool 104, third downhole tool 106, and/or fourth downhole tool 108 (e.g., Referring to FIG. 1). As illustrated, longer spacing between transmitters 134 and/or receiver 136 between first downhole tool 102, second downhole tool 104, third downhole tool 106, and/or fourth downhole tool 108 may make it difficult to decouple multi-components from spaced antennas. Conventional methods use depth shifting or averaging to create pseudo-collate antennas, which may work accurately for traditional one sub resistivity tools, where there may not be an azimuth offset between transmitter 134 and receiver 136. However, when an azimuth offset may be between transmitter 134 and receiver 136, the conventional way to decouple multi-components becomes troublesome and inaccurate. For example, a ninety degree azimuth offset between transmitter 134 and receiver 136 may lead to inaccurate measurements in the form of a singularity. As disclosed below, a method may be utilized to decouple multi-components from spaced antennas with any azimuth offset between transmitter 134 and receiver 136, and thus provides accurate and stable component signals as inputs for inversion calculations for any configurations of logging tool 300 or formation properties Logging tool 300 (e.g., Referring to FIG. 3) may include first downhole tool 102, second downhole tool 104, third downhole tool 106, and/or fourth downhole tool 108. For logging tool 300 with tilted transmitter 134 and receiver 136 (normally LWD tool, e.g., referring to FIG. 2), or logging tool 300 with transmitter 134, which may be tri-axial, and receiver 136 (normally a conveyance, e.g., referring to FIG. 1), responses from first downhole tool 102, second downhole tool 104, third downhole tool 106, and/or fourth downhole tool 108 may be broken into the following components:

$$\begin{bmatrix} Z_{XX} & Z_{XY} & Z_{XZ} \\ Z_{YX} & Z_{YY} & Z_{YZ} \\ Z_{ZY} & Z_{ZY} & Z_{ZZ} \end{bmatrix} \quad (1)$$

where Z symbolizes mutual impedance which is complex number, $Z_{xx}$, $Z_{yy}$, $Z_{zz}$ are known as the direct-coupling components and $Z_{xy}$, $Z_{yx}$, $Z_{xz}$, $Z_{zx}$, $Z_{yz}$, $Z_{zy}$ are known as the cross-coupling components.

Figure 4:
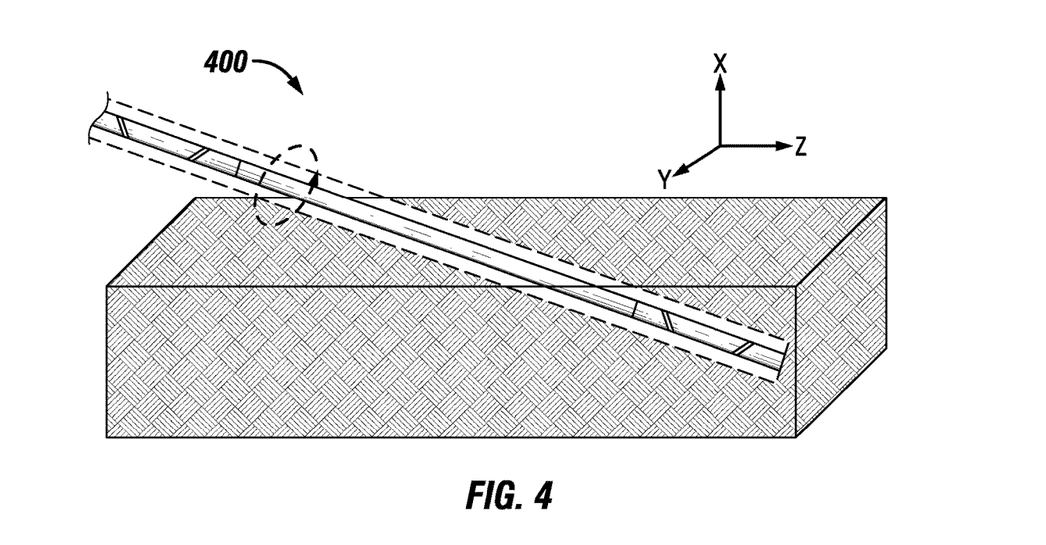
FIG. 4 illustrate a logging tool in an orientation schematic.

Based on rotating model 400, as illustrated in FIG. 4, which may represent first downhole tool 102, second downhole tool 104, third downhole tool 106, and/or fourth downhole tool 108, any response from any transmitter 134 and receiver 136 combinations may be produced from the components:

$$Z_R(\beta) = \begin{bmatrix} \sin\theta_t\cos\beta \\ \sin\theta_t\sin\beta \\ \cos\theta_t \end{bmatrix}^T \begin{bmatrix} Z_{xx} & Z_{yx} & Z_{zx} \\ Z_{xy} & Z_{yy} & Z_{zy} \\ Z_{xz} & Z_{yz} & Z_{zz} \end{bmatrix} \begin{bmatrix} \sin\theta_r\cos(\beta+\beta_{ref}) \\ \sin\theta_r\sin(\beta+\beta_{ref}) \\ \cos\theta_r \end{bmatrix} \quad (2)$$

where $Z_R(\beta)$ is the response for a transmitter 134-receiver 136 pair at first downhole tool 102, second downhole tool 104, third downhole tool 106, and/or fourth downhole tool 108 bin azimuth, $\beta$ is first downhole tool 102, second downhole tool 104, third downhole tool 106, and/or fourth downhole tool 108 rotating azimuth, $\beta_{ref}$ is first downhole tool 102, second downhole tool 104, third downhole tool 106, and/or fourth downhole tool 108 face offset between transmitter 134 and receiver 136, $\theta_t$ is the tilt angle of transmitter 134, $\theta_r$ is the tilt angle of receiver 136.

Here, Equation (2) may be further written as the following form with a use curve fitting algorithm to obtain parameters $Z_A$, $Z_B$, $Z_C$, $Z_D$:

$$Z_R(\beta') = Z_A\cos(2\beta' + \beta_{ref}) + Z_B\cos\beta' + Z_C\sin\beta' + Z_D \quad (3)$$

where $$\begin{cases} \beta' = \beta - \beta_{bed} \\ Z_A = (C_{xx} - C_{yy})/2 \\ Z_B = C_{zx}\cos\beta_{ref} + C_{xx} \\ Z_C = -C_{zx}\sin\beta_{ref}/2 \\ Z_D = C_{zz} + (C_{xx} + C_{yy})\cos\beta_{ref}/2 \end{cases} \quad (4)$$

where $$\begin{cases} C_{xx} = Z_{xx}\sin\theta_t\sin\theta_r & C_{yx} = Z_{yx}\sin\theta_t\sin\theta_r & C_{zx} = Z_{zx}\sin\theta_t\sin\theta_r \\ C_{xy} = Z_{xy}\sin\theta_t\sin\theta_r & C_{yy} = Z_{yy}\sin\theta_t\sin\theta_r & C_{zy} = Z_{zy}\sin\theta_t\sin\theta_r \\ C_{xz} = Z_{xz}\sin\theta_t\cos\theta_r & C_{yz} = Z_{yz}\sin\theta_t\sin\theta_r & C_{zz} = Z_{zz}\sin\theta_t\sin\theta_r \end{cases} \quad (5)$$

As a result, two collocated receivers 136 for a transmitter 134, may calculate the components from the curve fitted signals as:

$$\begin{cases} Z_{AR1} = (Z_{xx}\sin\theta_t\sin\theta_{r1} - Z_{yy}\sin\theta_t\sin\theta_{r1})/2 \\ Z_{BR1} = Z_{zx}\cos\theta_t\sin\theta_{r1}\cos\beta_{ref1} + Z_{xz}\sin\theta_t\cos\theta_{r1} \\ Z_{CR1} = -Z_{zx}\cos\theta_t\sin\theta_{r1}\sin\beta_{ref1} \\ Z_{DR1} = Z_{zz}\cos\theta_t\cos\theta_{r1} + (Z_{xx}\sin\theta_{r1} + Z_{yy}\sin\theta_t\sin\theta_{r1})\cos\beta_{ref1}/2 \\ Z_{AR2} = (Z_{xx}\sin\theta_t\sin\theta_{r1} + Z_{yy}\sin\theta_t\sin\theta_{r2})/2 \\ Z_{BR2} = Z_{zx}\cos\theta_t\sin\theta_{r2}\cos\beta_{ref2} + Z_{xz}\sin\theta_t\cos\theta_{r2} \\ Z_{CR2} = -Z_{zx}\cos\theta_t\sin\theta_{r2}\sin\beta_{ref2} \\ Z_{DR2} = Z_{zz}\cos\theta_t\cos\theta_{r2} + Z_{xx}\sin\theta_{r2} + Z_{yy}\sin\theta_t\sin\theta_{r2})\cos\beta_{ref2}/2 \end{cases} \quad (6)$$

$$\Rightarrow \begin{cases} Z_{xx} \\ Z_{yy} \\ Z_{zz} \\ Z_{xz} \\ Z_{zx} \end{cases}$$

To decouple air-hang component signals from the tool air-hang response, Equations (3) to (6) may be simplified as:

$$Z_{AIR} = Z_D \quad (7)$$

where $$Z_D = Z_{zz}\cos\theta_t\cos\theta_r + Z_{xx}\sin\theta_t\sin\theta_r\cos\beta_{ref} \quad (8)$$

Similarly, if we have two collocated coil receivers for the same transmitter, then we can calculate the components from the air-hang response as:

$$\begin{cases} Z_{DR1} = Z_{zz}\cos\theta_t\cos\theta_{r1} + Z_{xx}\sin\theta_t\sin\theta_{r1}\cos\beta_{ref1} \\ Z_{DR2} = Z_{zz}\cos\theta_t\cos\theta_{r2} + Z_{xx}\sin\theta_t\sin\theta_{r2}\cos\beta_{ref2} \end{cases} \Rightarrow \begin{cases} Z_{zz} \\ Z_{xx} \end{cases} \quad (9)$$

Figure 5:
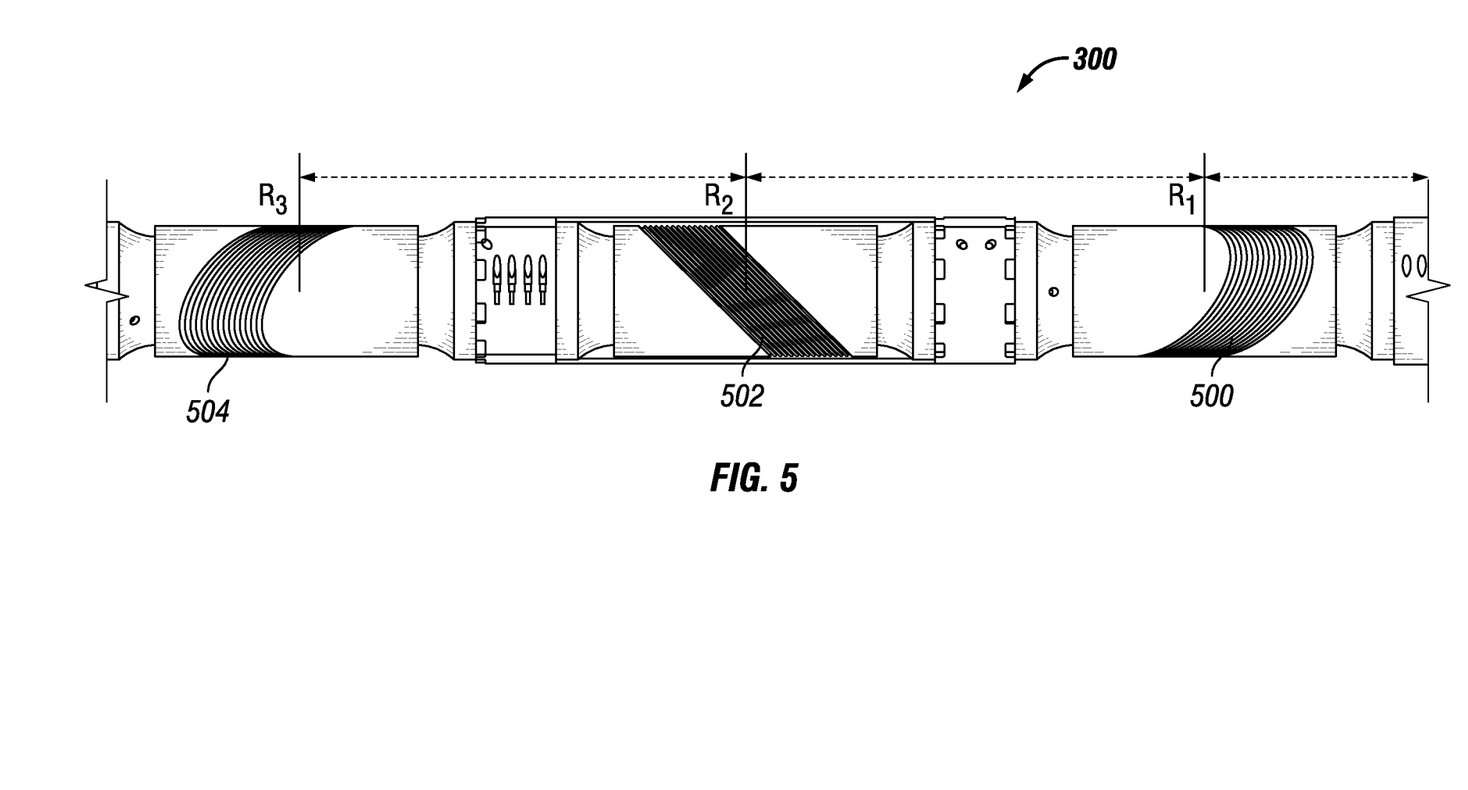
FIG. 5 illustrates at least a part of a logging tool.

FIG. 5 illustrates at least a portion of a logging tool 300 (Referring to FIG. 3). Due to mechanical constraints and antenna interference considerations, logging tool 300 may include a first antenna 500, a second antenna 502, and a third antenna 504 within one sub module may be spaced apart instead of collocated together. First antenna 500, second antenna 502, and third antenna 504 may have one hundred and twenty degrees azimuth offset between them. Each antenna may transmit and/or receive signals. These signals may be processed in an inversion scheme to determine formation properties and/or boundaries. Before inversion schemes may be utilized to determine formation properties, record component signals of first antenna 500, second antenna 502, and third antenna 504 may be determined through decoupling.

Figure 6:
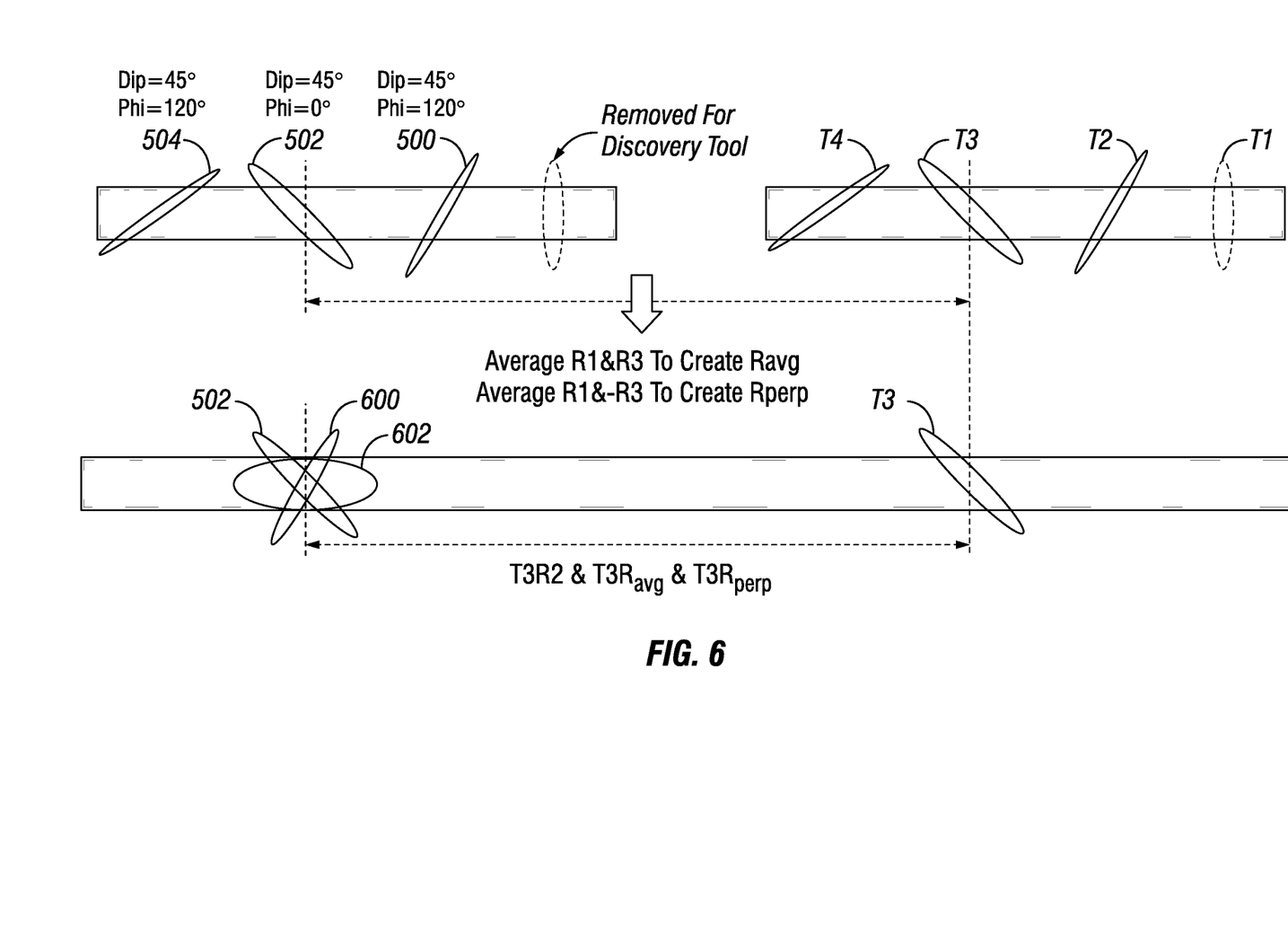
FIG. 6a-6e illustrate amplitude error for a decoupled $Z_{xx}$ component in 2000-ohmm homogenous formation.
Figure 7A:
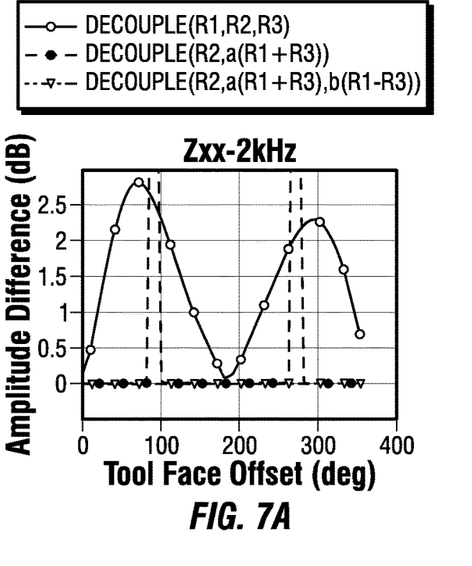
FIG. 7a-7e illustrate phase error for a decoupled $Z_{xx}$ component in 2000-ohmm homogenous formation.
Figure 7B:
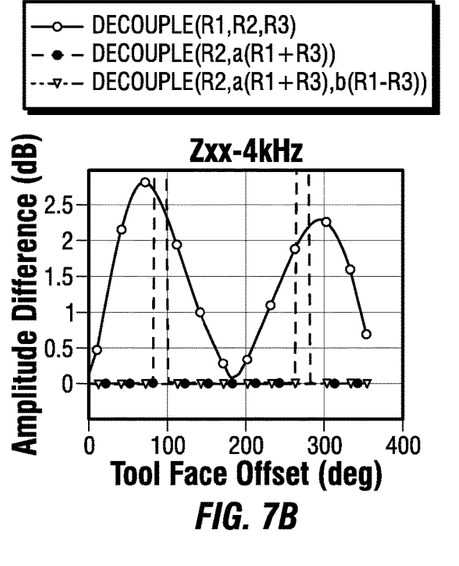
Figure 7C:
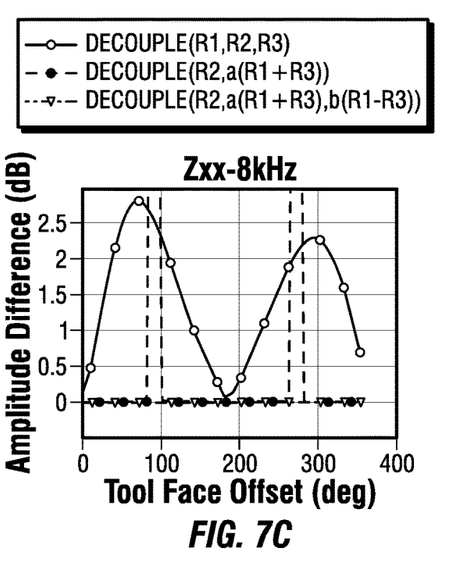
Figure 7D:
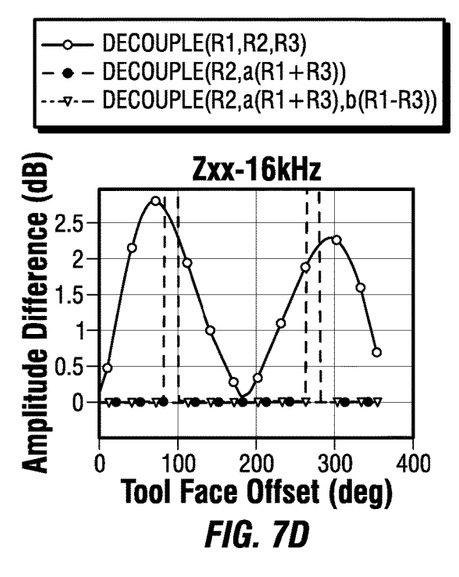
Figure 7E:
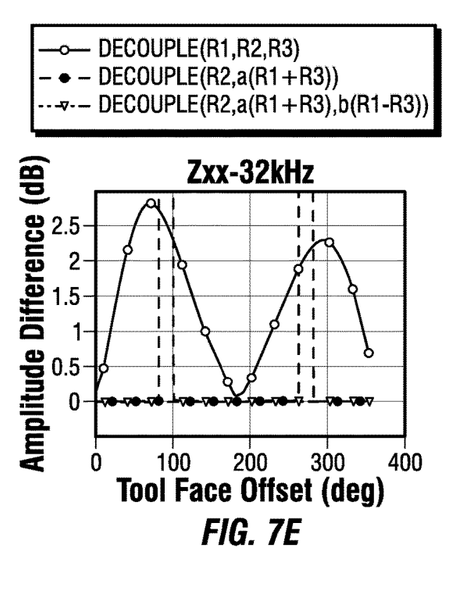
Figure 8A:
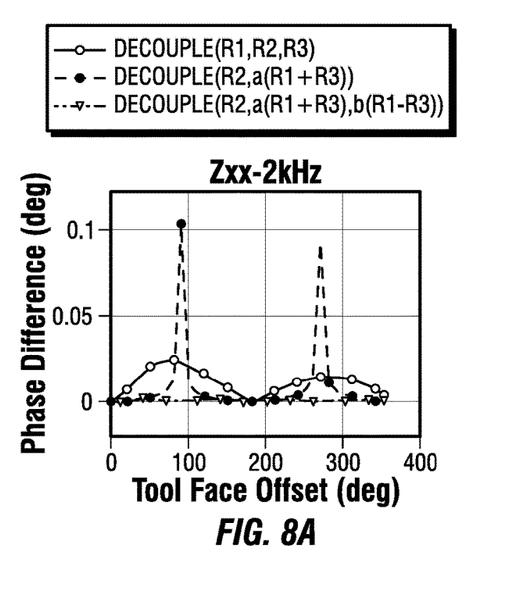
FIG. 8a-8e illustrates amplitude error for a decoupled $Z_{xx}$ component in 20-ohmm homogenous formation.
Figure 8B:
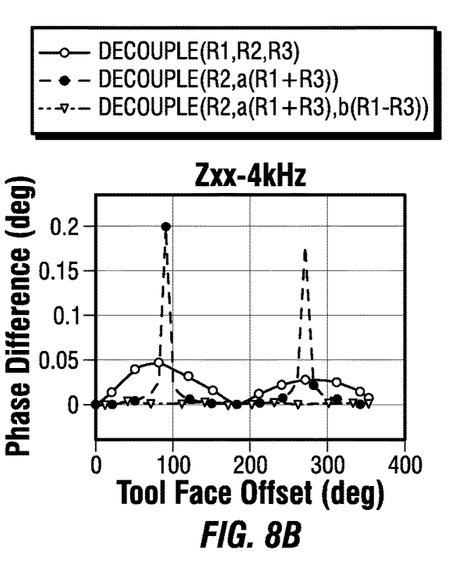
Figure 8C:
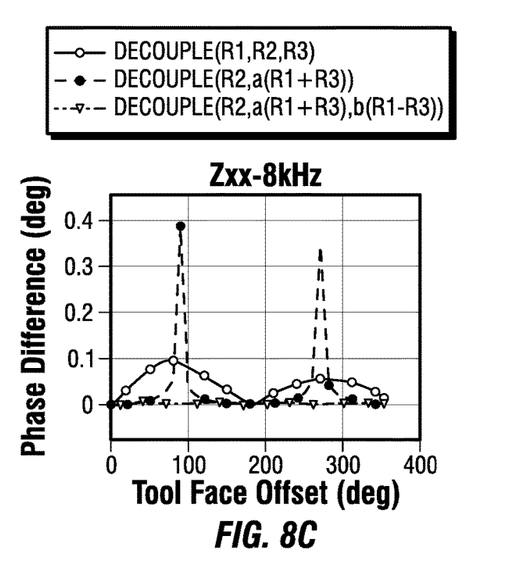
Figure 8D:
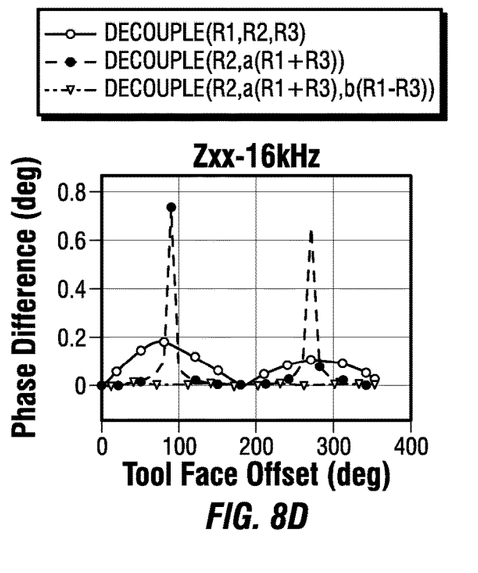
Figure 8E:
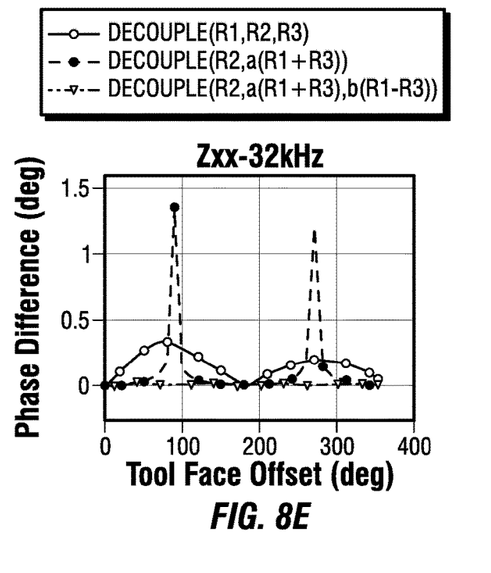
Figure 9A:
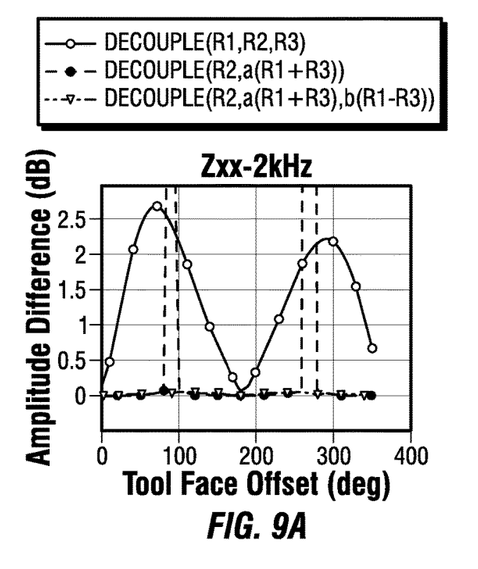
FIG. 9a-9e illustrates phase error for a decoupled $Z_{xx}$ component in 20-ohmm homogenous formation.
Figure 9B:
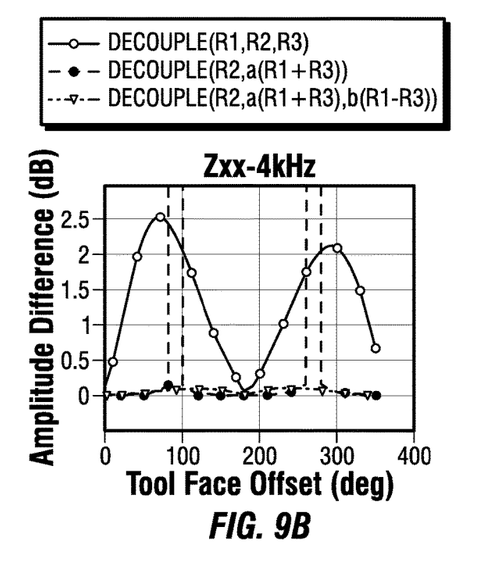
Figure 9C:
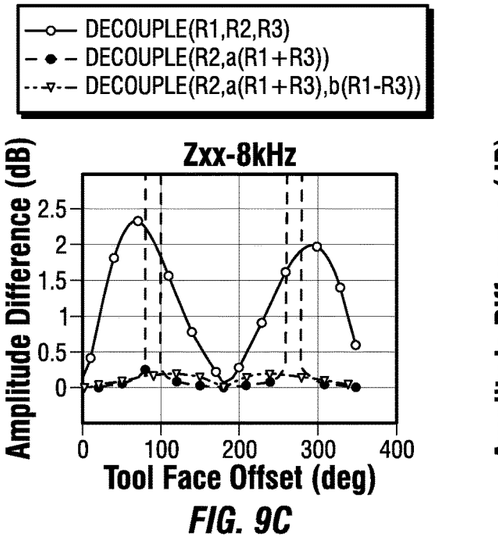
Figure 9D:
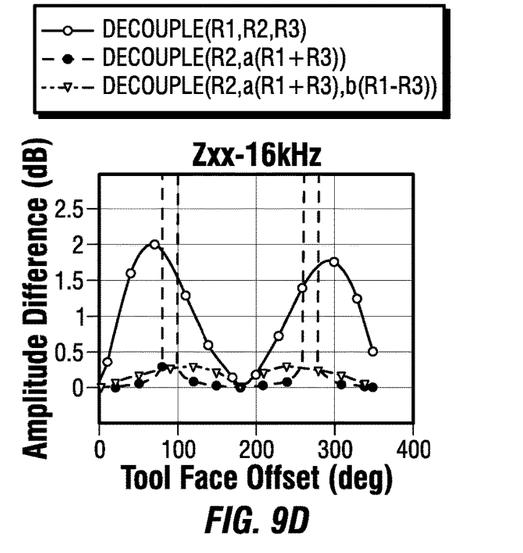
Figure 9E:
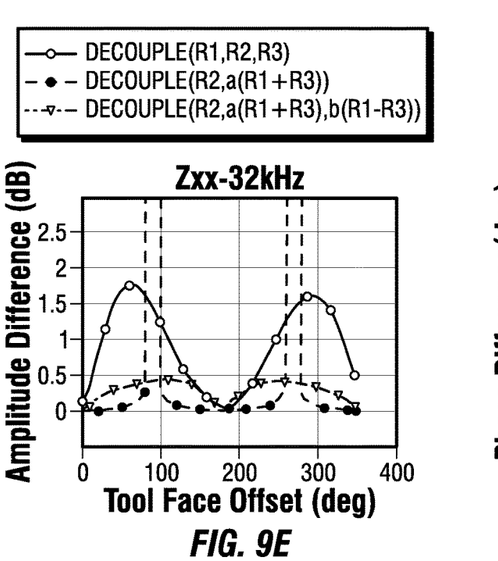
Figure 10A:
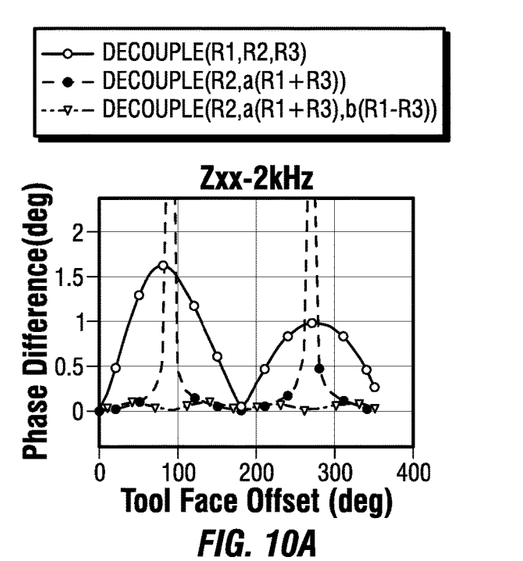
FIG. 10a illustrates amplitude error from current methods.
Figure 10B:
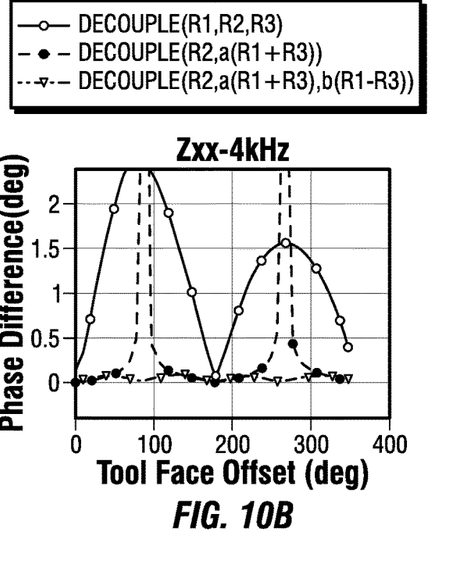
FIG. 10b illustrates amplitude error with new methods.
Figure 10C:
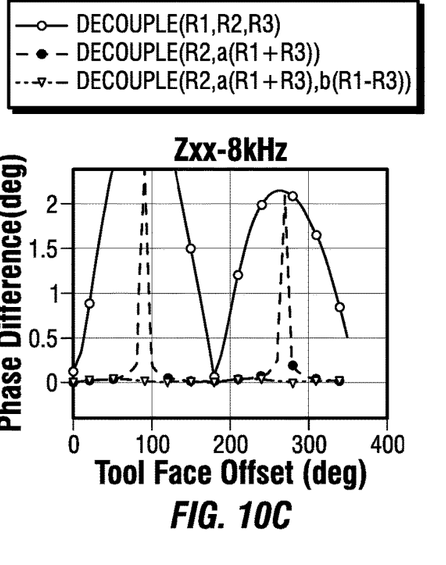
Figure 10D:
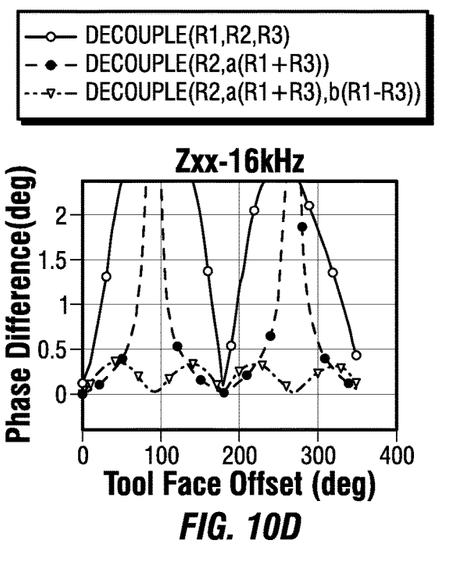
Figure 10E:
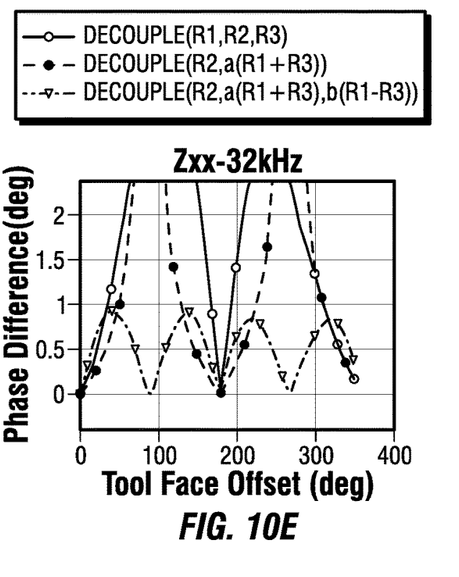

Referring to Equation 6, responses from two collocated antennas may be utilized to solve for the components. However, alternatively, as illustrated in FIG. 6, decoupling may be performed by generating nearly perpendicular averaged pseudo antennas. By averaging first antenna 500 and third antenna 504 (Referring to FIG. 5), a pseudo antenna average may be found, denoted as pseudo antenna 600. This may have the same $\beta_{ref}$ as second antenna 502 (Referring to FIG. 5), which may cause a singularity issue at $\beta_{ref}=90$. To prevent this issue, a second pseudo antenna 602, which may have an azimuth offset of $\beta_{ref}+90$. Thus, second pseudo antenna 602 may be perpendicular to second antenna 502 and pseudo antenna 600. This may be performed by averaging first antenna 500 with the inverse of third antenna 504, as illustrated in FIG. 6. This may allow for the below equation to decouple the components of first antenna 500, second antenna 502, and/or third antenna 504.

$$\begin{cases} (Z_{AR2}, Z_{BR2}, Z_{CR2}, Z_{DR2}) = f_2(Z_{xx}, Z_{yy}, Z_{zz}, Z_{xz}, Z_{zx}) \\ (Z_{ARavg}, Z_{BRavg}, Z_{CRavg}, Z_{DRavg}) = f_{avg}(Z_{xx}, Z_{yy}, Z_{zz}, Z_{xz}, Z_{zx}) \\ (Z_{ARperp}, Z_{BRperp}, Z_{CRperp}, Z_{DRperp}) = f_{perp}(Z_{xx}, Z_{yy}, Z_{zz}, Z_{xz}, Z_{zx}) \end{cases} \quad (10)$$

In Equation (10), since $\cos \beta_{ref}$ and $\cos(\beta_{ref}+90)$ cannot be 0 at the same time, no matter what azimuth offset $\beta_{ref}$ may be, this may allow for decoupling components without singularities. Furthermore, as illustrated in FIG. 6, there may be a first transmitter 604, a second transmitter 606, a third transmitter 608, and/or a fourth transmitter 610. To decouple the component signal, third transmitter 608 (which may be a tilted transmitter) may be utilized. It should be noted that any tilted transmitter, such as second transmitter 606 and/or fourth transmitter 610 may also be utilized. However, first transmitter 604 may not be utilized as it may only provide Zzz and Zzx component signals.

Additionally, attenuation/expansion factors may be utilized to generate pseudo collocated antenna responses. A simple approach to perform the response averaging as seen below:

$$\begin{cases} Z_{avg} = (Z_1 + Z_3)/2 \\ Z_{perp} = (Z_1 - Z_3)/2 \end{cases} \quad (10)$$

However, this approach may lead to inaccuracies because the derived Equation (X) is a linear combination of Equations in (10). To improve accuracy, attenuation/expansion factors may be applied to the response before averaging. In general, the fields of a source in a homogeneous isotropic medium may be written as a multipole expansion. The terms in this expansion are spherical harmonics (which give the angular dependence) multiplied by spherical Bessel functions (which give the radial dependence). For large r, the spherical Bessel functions decay is 1/r. However, as one gets closer and closer to the source (smaller r), approaching the near field, other powers of r become significant. The next term that becomes significant is proportional to $1/r^2$ and may be characterized as an induction term. It may be thought of as the primarily magnetic energy stored in the field, and returned to the antenna in every half-cycle, through self-induction. For even smaller r, terms proportional to $1/r^3$ become significant. This may be characterized as an electrostatic field term and may be thought of as stemming from the electrical charge in an antenna element. Due to the frequency for logging tool 300 (Referring to FIG. 3) at most time being extremely low (500 Hz to 32 kHz), most likely $1/r^2$ and $1/r^3$ will play major role in the attenuation/expansion factor. As a result, the response averaging could be calculated more accurately as:

$$\begin{cases} Z_{avg} = (\alpha(r_1/r_2)Z_1 + \alpha(r_3/r_2)Z_3)/2 \\ Z_{perp} = (\beta(r_1/r_2)Z_1 - \beta(r_3/r_2)Z_3)/2 \end{cases} \quad (12)$$

Here, $\alpha$ and $\beta$ are attenuation/expansion factors proportional to $1/r$, $1/r^2$ and $1/r^3$. In FIGS. 6a-6e and 7a-7e, several combinations of these factors are utilized. FIGS. 8a-8e and 9a-9e illustrate that current frequency from logging tool 300 (referring to FIG. 3) and tool spacing, factor $1/r^3$ may allow for the best accuracy for averaged amplitude response and $1/r^2$ may allow for the best accuracy for averaged phase response.

Figure 11A:
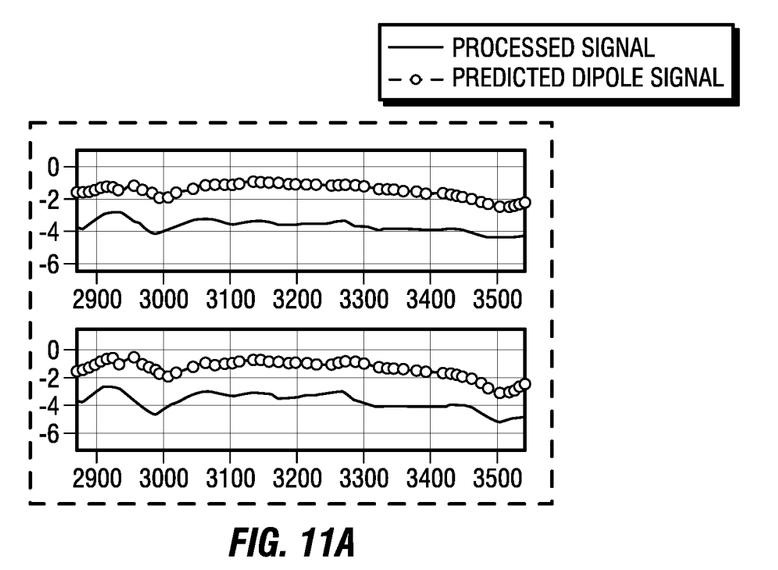
Figure 11B:
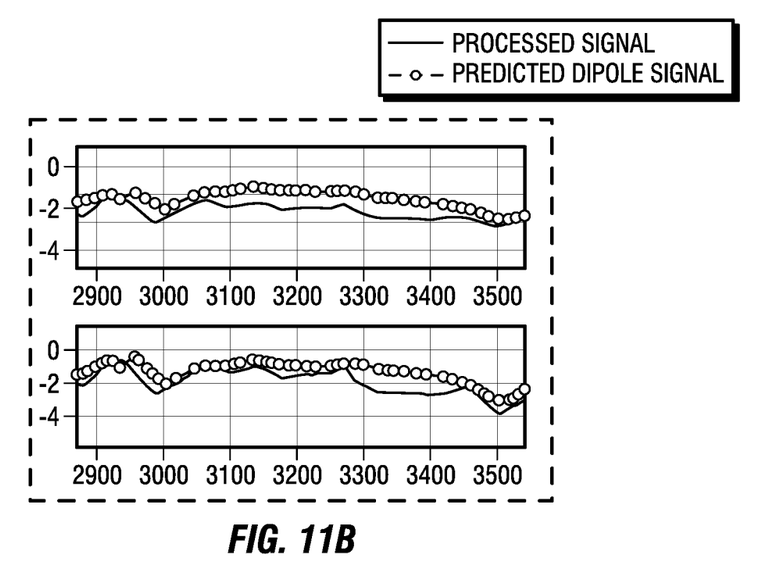

FIGS. 11a and 11b illustrate a dot curve which represents decoupled components from field data and the solid line curve is an expected response based on pre-well modeling. FIG. 11a shows are result from using conventional decoupling methods, which results in large error between field response and predicted response. FIG. 11b shows the result using the decoupling method disclosed above, which reduces the error between field response and predicted response.

This method and system may include any of the various features of the compositions, methods, and system disclosed herein, including one or more of the following statements.

Statement 1: A method for decoupling a component signal comprising: disposing a logging tool in a wellbore; capturing a signal response with the logging tool from a formation, wherein the logging tool comprises a first receiver, a second receiver, and a third receiver; averaging the first receiver and the third receiver to generate a first pseudo antenna; generating a second pseudo antenna which comprises an azimuth offset of $\beta_{ref}+90$, wherein $\beta_{ref}$ is an azimuth offset; employing an attenuation factor and expansion factor to generate a pseudo collated antenna; combining responses from a transmitter, the first pseudo antenna, and the second pseudo antenna to decouple a component; and determining boundaries of the formation from the component.

Statement 2: The method of statement 1, further comprising: disposing the logging tool into the wellbore with a drilling system; and altering path of the drilling system to the formation.

Statement 3: The method of statement 1 or statement 2, wherein the logging tool is disposed on a drill string.

Statement 4: The method of any preceding statement, further comprising: disposing the logging tool into the wellbore with a conveyance; and altering path of a drilling system to the formation.

Statement 5: The method of any preceding statement, wherein the conveyance is a wireline.

Statement 6: The method of any preceding statement, averaging the pseudo collate antenna with a factor of $1/r^3$, wherein r is radial dependence, for determining an average amplitude.

Statement 7: The method of any preceding statement, averaging the pseudo collate antenna with a factor of $1/r^2$, wherein r is radial dependence, for determining an averaged phase response.

Statement 8: The method of any preceding statement, wherein the logging tool comprises a first downhole tool.

Statement 9: The method of any preceding statement, wherein the logging tool comprises a second downhole tool.

Statement 10: The method of any preceding statement, wherein the logging tool comprises a third downhole tool and a fourth downhole tool.

Statement 11: A well measurement system for decoupling a component signal comprising: a logging tool, wherein the logging tool comprises: a first downhole tool; a receiver; and a transmitter; a conveyance, wherein the conveyance is attached to the logging tool; and an information handling system, wherein the information handling system is operable to receive a signal response of the logging tool from a formation, generate a first pseudo antenna; generate a second pseudo antenna; employ an attenuation factor and expansion factor to generate a pseudo collated antenna; combine responses from the transmitter, the first pseudo antenna, and the second pseudo antenna to decouple a component; and determining boundaries of the formation from the component.

Statement 12: The well measurement system of statement 11, wherein the logging tool comprises a second downhole tool.

Statement 13: The well measurement system of statement 11 of statement 12, wherein the logging tool comprises a third downhole tool and a fourth downhole tool.

Statement 14: The well measurement system of statements 11-13, wherein the information handling system is further operable to average the pseudo collate antenna with a factor of $1/r^3$, wherein r is radial dependence, for determining an average amplitude.

Statement 15: The well measurement system of statements 11-14, wherein the information handling system is further operable to average the pseudo collate antenna with a factor of $1/r^2$, wherein r is radial dependence, for determining an averaged phase response.

Statement 16: The well measurement system of statements 11-15, wherein the conveyance comprises a drill string.

Statement 17: A well measurement system for decoupling a component signal comprising: a logging tool, wherein the logging tool comprises: a first downhole tool; a receiver; and a transmitter; a drill string, wherein the drill string is connected to a drilling system; and an information handling system, wherein the information handling system is operable to receive a signal response of the logging tool from a formation, generate a first pseudo antenna; generate a second pseudo antenna; employ an attenuation factor and expansion factor to generate a pseudo collated antenna; combine responses from the transmitter, the first pseudo antenna, and the second pseudo antenna to decouple a component; and determining boundaries of the formation from the component.

Statement 18: The well measurement system of statement 17, wherein the logging tool comprises a second downhole tool.

Statement 19: The well measurement system of statement 17 or statement 18, wherein the information handling system is further operable to average the pseudo collate antenna with a factor of $1/r^3$, wherein r is radial dependence, for determining an average amplitude.

Statement 20: The well measurement system of statements 17-19, wherein the information handling system is further operable to average the pseudo collate antenna with a factor of $1/r^2$, wherein r is radial dependence, for determining an average phase response.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for decoupling a component signal comprising:
disposing a logging tool in a wellbore;
capturing a signal response with the logging tool from a formation, wherein the logging tool comprises a first receiver, a second receiver, and a third receiver;
averaging the first receiver and the third receiver to generate a first pseudo antenna;
generating a second pseudo antenna which comprises an azimuth offset of $\beta_{ref}+90$, wherein $\beta_{ref}$ is an azimuth offset;
employing an attenuation factor and expansion factor to generate a pseudo collocated antenna;
combining responses from a transmitter, the first pseudo antenna, and the second pseudo antenna, and the pseudo collocated antenna to decouple a component; and
determining boundaries of the formation from the component.

2. The method of claim 1, further comprising:
disposing the logging tool into the wellbore with a drilling system; and
altering a path of the drilling system to the formation.

3. The method of claim 2, wherein the logging tool is disposed on a drill string.

4. The method of claim 1, further comprising:
disposing the logging tool into the wellbore with a conveyance; and
altering a path of a drilling system to the formation.

5. The method of claim 4, wherein the conveyance is a wireline.

6. The method of claim 4, averaging the pseudo collocated antenna with a factor of $1/r^3$, wherein r is radial dependence, for determining an average amplitude.

7. The method of claim 6, averaging the pseudo collocated antenna with a factor of $1/r^2$, wherein r is radial dependence, for determining an averaged phase response.

8. The method of claim 1, wherein the logging tool comprises a first downhole tool.

9. The method of claim 8, wherein the logging tool comprises a second downhole tool.

10. The method of claim 9, wherein the logging tool comprises a third downhole tool and a fourth downhole tool.

11. A well measurement system for decoupling a component signal comprising:
a logging tool, wherein the logging tool comprises:
a first downhole tool;
a receiver; and
a transmitter;
a conveyance, wherein the conveyance is attached to the logging tool; and
an information handling system, wherein the information handling system is operable to receive a signal response of the logging tool from a formation, generate a first pseudo antenna; generate a second pseudo antenna; employ an attenuation factor and expansion factor to generate a pseudo collocated antenna; combine responses from the transmitter, the first pseudo antenna, the second pseudo antenna, and the pseudo collocated antenna to decouple a component; and determining boundaries of the formation from the component.

12. The well measurement system of claim 11, wherein the logging tool comprises a second downhole tool.

13. The well measurement system of claim 12, wherein the logging tool comprises a third downhole tool and a fourth downhole tool.

14. The well measurement system of claim 11, wherein the information handling system is further operable to average the pseudo collocated antenna with a factor of $1/r^3$, wherein r is radial dependence, for determining an average amplitude.

15. The well measurement system of claim 14, wherein the information handling system is further operable to average the pseudo collocated antenna with a factor of $1/r^2$, wherein r is radial dependence, for determining an averaged phase response.

16. The well measurement system of claim 11, wherein the conveyance comprises a drill string.

17. A well measurement system for decoupling a component signal comprising:
a logging tool, wherein the logging tool comprises:
a first downhole tool;
a receiver; and
a transmitter;
a drill string, wherein the drill string is connected to a drilling system; and
an information handling system, wherein the information handling system is operable to receive a signal response of the logging tool from a formation, generate a first pseudo antenna; generate a second pseudo antenna; employ an attenuation factor and expansion factor to generate a pseudo collocated antenna; combine responses from the transmitter, the first pseudo antenna, the second pseudo antenna, and the pseudo collocated antenna to decouple a component; and determining boundaries of the formation from the component.

18. The well measurement system of claim 17, wherein the logging tool comprises a second downhole tool.

19. The well measurement system of claim 17, wherein the information handling system is further operable to average the pseudo collocated collate antenna with a factor of $1/r^3$, wherein r is radial dependence, for determining an average amplitude.

20. The well measurement system of claim 17, wherein the information handling system is further operable to average the pseudo collocated antenna with a factor of $1/r^2$, wherein r is radial dependence, for determining an average phase response.

* * * * *